Dec. 7, 1943.  H. G. BUSIGNIES  2,335,996
DEMOUNTABLE GONIOMETER ARRANGEMENT
Filed Feb. 19, 1941  2 Sheets-Sheet 1

INVENTOR
HENRI G. BUSIGNIES
BY
ATTORNEY

Dec. 7, 1943.   H. G. BUSIGNIES   2,335,996
DEMOUNTABLE GONIOMETER ARRANGEMENT
Filed Feb. 19, 1941   2 Sheets-Sheet 2

INVENTOR
HENRI G. BUSIGNIES
BY
ATTORNEY

Patented Dec. 7, 1943

2,335,996

UNITED STATES PATENT OFFICE 2,335,996

DEMOUNTABLE GONIOMETER ARRANGEMENT

Henri G. Busignies, Forest Hills, N. Y., assignor to International Standard Electric Corporation, New York, N. Y., a corporation of Delaware Application February 19, 1941, Serial No. 379,574

6 Claims. (Cl. 171—119)

The present invention relates to devices particularly applicable to radio direction finding and more particularly to finders and to generators of reference currents for radio direction finders.

It is known that the directional systems used in radio direction finding arrangements consist of perpendicular loop aerials or antenna systems, e. g., the so-called Adcock antennas which terminate in a system of perpendicular coils in the middle of which there is another coil called the finder which can be orientated by hand or driven continuously by a motor at the same time as a reference current generator.

The present invention provides in particular for a radio-goniometric finder and the reference current generator that is coupled to it so as to comprise an assembly of arrangements that will permit the construction of an instrument of little bulk which is easily taken apart and the connection of which to the measuring instruments is made without the use of rubbing contacts.

Among these arrangements it will here be mentioned that the radio direction finder comprises in combination the finder properly so-called and the coupling transformer.

According to the invention, the potentiometric reference generator may comprise a considerable number of resistance elements terminating in the collector which has a great number of segments in order to obtain reference currents of sufficiently exact sine wave shape for use in particular with a cathode ray oscillograph indicating device.

The various features of the invention are explained hereunder with reference to the following description of one example of an embodiment shown in the appended drawings, in which.

Figure 1:
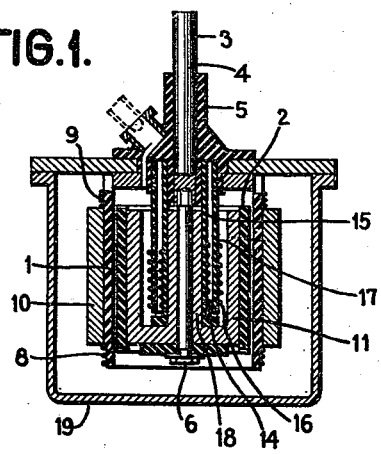
Fig. 1 is a sectional view of one example of an embodiment of a radio direction finder.

The finder consists of two sets of coils, a stationary one which is carried by support 1 and another carried by the rotating support 2. These supports consist of coaxial cylinders provided with recesses or grooves; cylinder 2 can rotate around its axis 3 by means of a shaft 4 which turns in the journal 5 and to which cylindrical support 2 is secured by means of a threaded rod and a nut 6, for example.

Cylinder 1 which serves as support for the stationary coil has its ends provided with notches 7 (see Fig. 2) in which the wires are disposed. The winding used in this example is an imbricated two-phase winding, but it may be of another type such as one of those used in the construction of the stators of alternating current generators. The wires that pass from one notch to the other are shown in section at 8 and 9 in Fig. 1, and in perspective at 8 in Fig. 2. On one side provision has been made for a reduction of the diameter of cylinder 1 at 8 in order to be able to slip a cylinder of magnetic material 10, e. g., of compressed powder, over the cylindrical support 1. The recess thus provided enables the magnetic cylinder to be slipped on after assembly or to be removed afterwards, e. g., for repairs or replacement if it happens to get broken. This replacement can thus be made without disassembling the instrument.

Figure 2:
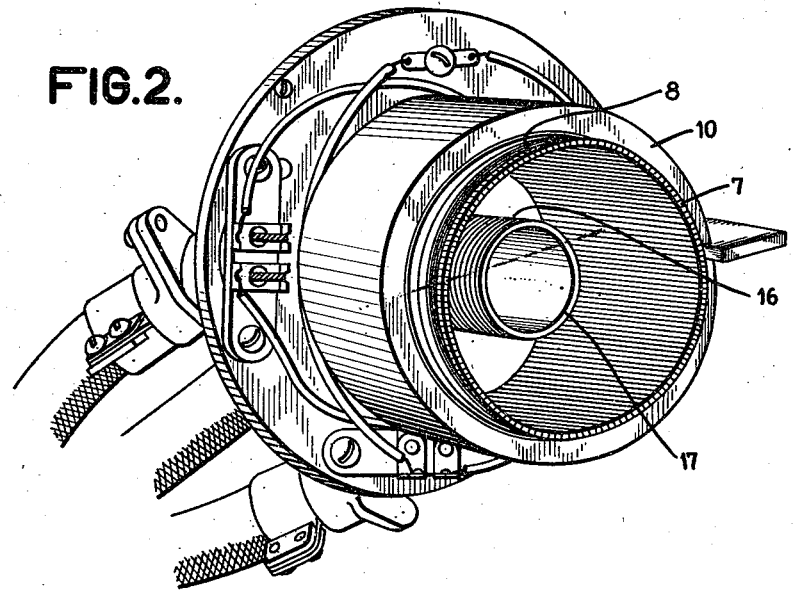
Figs. 2 and 2A show in perspective the same instrument taken apart, in which the same members are indicated by the same reference numbers.
Figure 2A:
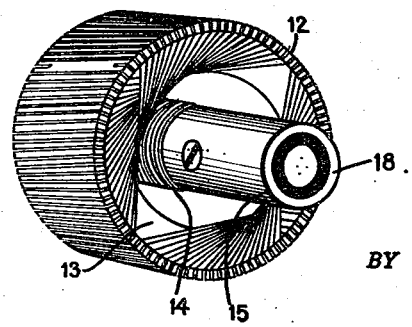

The inner winding is likewise coiled in slots provided in the cylindrical support 2, as shown at 12 in Fig. 2A. This coiling is likewise a bipolar imbricated coiling which in this case is similar to the coilng of the armature of a dynamo. The magnetic circuit may also in this case be improved by the use of a cylinder of magnetic material 11, e. g., of compressed powder. As can be seen in Fig. 2, the coiling wires are inclined in order to make the flux variations more uniform.

In order to avoid the troubles resulting from the use of collector brushes, the ends of the winding of finder 2 are connected to a coil 14 which is wound around a cylindrical support 15. This coil is located within a second coil 16 which is wound around a cylindrical support 17 that is coaxial with the previously mentioned one and is stationary. This coiling system constitutes a transformer that permits of finder 2 being connected to the radio direction finding instruments without interposition of rubbing contacts. In order to improve the operation of this transformer, it is also provided with a magnetic member 18 which is located within the cylinder 15 and rotates with it.

It can be seen that the entire rotor assembly can be removed at once from the stator for repairs or for any other reason.

A shielding housing 19 encloses the entire instrument and protects it both mechanically and electrically.

Figure 3:
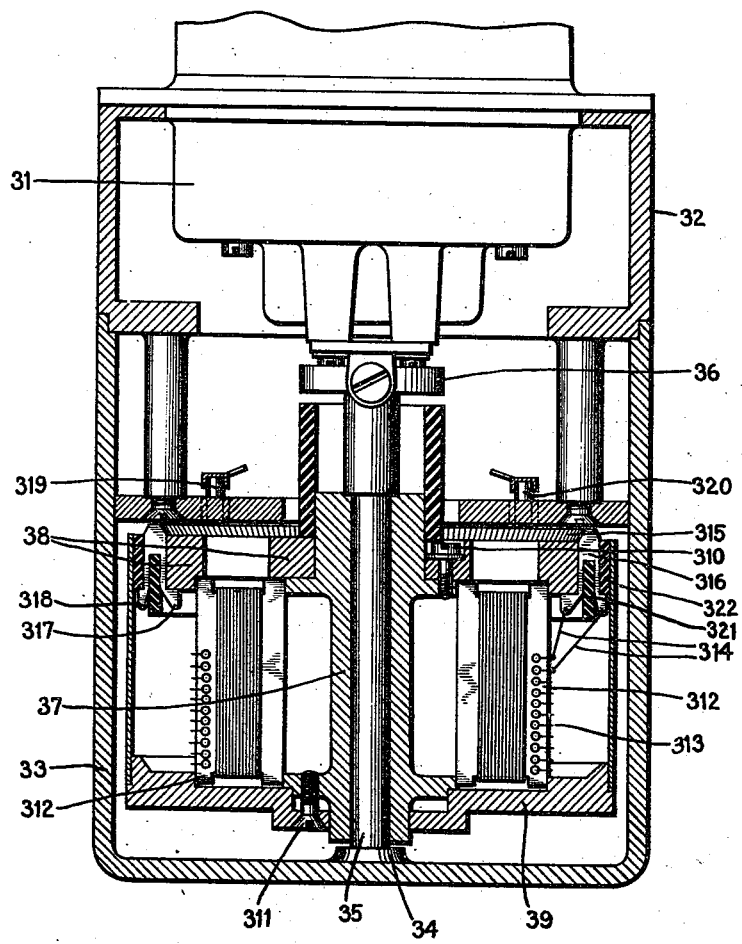
Fig. 3 is a sectional view of a reference current generator for a radio direction finder.

Fig. 3 illustrates an example of an embodiment of a reference current generator coupled to the finder described in connection with Figs. 1 and 2.

This generator may have a number of variable phases, but as a rule it produces two-phase currents. In order to use these instruments with cathode ray indicators, it is necessary for the generated currents to have a sine shape with an approximation much greater than that of generators used with indicating instruments employing mechanical devices.

In order to obtain this result, the generator shown in the drawings consists of a great number of resistances inserted in the circuit of a direct source of current by means of a segment collector system rubbed by four brushes, for example, in the case of a two-phase generator.

On the end of the motor housing 31 (Fig. 3) there is secured a support 32 on which a housing 33 fits snugly; the end of this housing carries an end bearing 34 that supports the end of the generator shaft 35 which is connected to the motor shaft by a coupling 36. This mechanical arrangement is of course subject to any desired alteration.

On shaft 35 there is keyed a driving member 37 on which there are secured mounting plates 38 and 39 attached by screws of which only two, 310 and 311, are shown in the drawings.

Resistances are secured in radial slots between these plates.

These resistances consist of insulating plates 312 on which there are coiled a series of resistances abutting against pins or rigid wires 313.

The resistance elements are calculated in such a way that the variation of voltage obtained is quite sinusoidal, and they are connected by wires 314 of which only two are shown, to the segments of collector 315. This collector consists of segments 316 whose connecting lugs 318 are disposed alternately for the purpose of making soldering easier.

The number of segments may be 720, for example, i. e., 2 for each degree in order to obtain precise readings on an oscillograph of normal diameter.

The segments of collector 316 are provided with slots fitting over mounting ring 321 of insulating material and, after installation on this ring, they are held in place between a shrunk-on collar 322 and the plate 38.

The alternating current collector brushes are shown at 319 and 320 and their number corresponds to the desired number of phases. The direct current lead-in rings are not shown.

The illustrated arrangement makes it possible to obtain the desired result with a device of slight bulk and weight.

Although the invention has been explained with reference to the above described embodiment it is evident that it is by no means limited to the same and that it is capable of numerous variations and modifications without departing from its scope.

What is claimed is:

1. An arrangement for a direction finder of the type wherein a signal envelope derived from a continuously rotatable collector is to be obtained, including a collector comprising a stationary antenna coil of hollow cylindrical form, a rotatable pick-up coil of hollow cylindrical form mounted concentrically with respect to said antenna coil, and transformer windings mounted concentrically of said pick-up coil, one of said transformer windings being rotatable and connected to said pick-up coil.

2. An arrangement according to claim 1, further comprising a support for said stationary coil provided with a core retaining portion, and a high frequency iron core mounted on said retaining portion.

3. An arrangement according to claim 1, further comprising a support for said stationary coil provided with a core retaining portion, a high frequency iron core mounted on said retaining portion, and an iron core fitted within said pick-up coil and having a position extending into said transformer windings.

4. A demountable goniometer comprising a cylindrical stationary field coil assembly having an open end, a rotary cylindrical pick-up coil mounted concentrically within the field coil assembly and insertable through said open end, a cylindrical inductive transfer winding mounted coaxially on the pick-up coil and rotating therewith and a stationary coaxial transfer coil inductively associated with the rotating transfer coil.

5. A demountable radio goniometer comprising a field coil assembly of hollow cylindrical form with one end open, a removable ring of magnetic material mounted exteriorly of said field coil assembly, a rotary pick-up coil of cylindrical form mounted concentrically of said field coil assembly insertable into said open end, a core of magnetic material removably contained concentrically of said rotatable pick-up coil, and means for maintaining said rotary pick-up coil in inserted position.

6. A demountable goniometer as set forth in claim 5, in which said core of magnetic material is provided with an outer shell and a central core, and a set of transformer windings is provided on said central core, whereby the outer shell of said magnetic core serves as an electrostatic shield between said transformer windings and said goniometer proper.

HENRI G. BUSIGNIES.